United States Patent [19]
Anderson et al.

[11] 3,893,205
[45] July 8, 1975

[54] COMPOSITE METAL MATERIAL AND ARTICLES MADE THEREFROM

[75] Inventors: Ray B. Anderson, Attleboro; Robert Baboian, North Attleboro, both of Mass.

[73] Assignee: Texas Instruments Incorporated, Dallas, Tex.

[22] Filed: Sept. 25, 1970

[21] Appl. No.: 75,388

[52] U.S. Cl. ............... 16/121; 29/196.2; 220/2.1 R
[51] Int. Cl. ...... B32b 15/18; E05b 1/06; H01k 1/20
[58] Field of Search .... 29/196.3, 196.2, 191, 191.6, 29/183, 183.5, 199; 313/318; 16/121; 220/2.1 R; 204/40, 13

[56] References Cited
UNITED STATES PATENTS

| | | | |
|---|---|---|---|
| 2,916,337 | 12/1959 | Fike | 29/196.2 X |
| 2,978,799 | 4/1961 | Benteler | 29/196.3 X |
| 3,112,185 | 11/1963 | Ochsner | 29/196.2 X |
| 3,261,724 | 7/1966 | Ulam | 29/196.2 UX |
| 3,305,384 | 2/1967 | Kenderi | 29/196.2 X |
| 3,381,365 | 5/1968 | Winter | 29/196.3 X |
| 3,490,124 | 1/1970 | Miller | 29/191 |
| 3,589,873 | 6/1971 | Poth | 29/196.2 X |
| 3,589,874 | 6/1971 | Butt | 29/199 X |

*Primary Examiner*—Allen B. Curtis
*Attorney, Agent, or Firm*—James P. McAndrews; John A. Haug; Russell E. Baumann

[57] ABSTRACT

A composite metal material displaying lower cost and improved strength and corrosion resistance is shown to comprise a layer of copper or brass material and a layer of aluminum material solid-phase metallurgically bonded to respective opposite sides of a layer of low carbon steel. The composite material is formed into an article such as a lamp bulb base or a door knob with the brass or copper layer of the composite material facing exteriorly of the article, the aluminum layer of the composite material then serving as a preferentially corrosive material which protects the low carbon steel layer of the composite material from corrosion.

8 Claims, 3 Drawing Figures

PATENTED JUL 8 1975     3,893,205

Inventors:
Ray B. Anderson,
Robert Baboian,
by James P. McAndrews
Att'y.

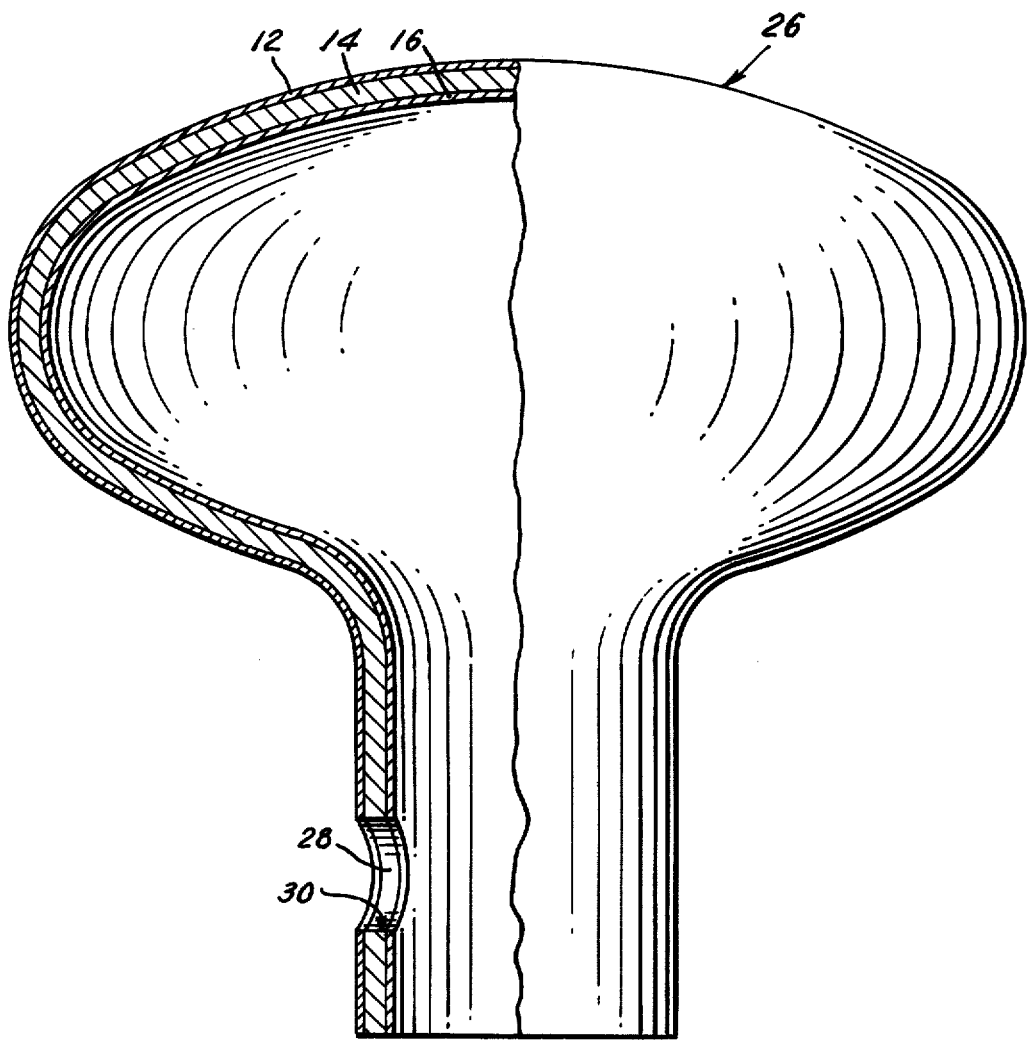

COMPOSITE METAL MATERIAL AND ARTICLES MADE THEREFROM

As is well known, many articles of commerce such as lamp bulb bases, door knobs and door knob surrounds, lamp bases and the like are conventionally formed of brass or copper materials to provide the articles with attractively colored, corrosion-resistant surfaces. Where such articles are formed entirely of brass or copper, it is found that substantial thicknesses of the materials are required to provide the articles with sufficient strength and the article costs tend to be excessive. The excessive nature of the article costs become particularly apparent when it is noted that, in most such articles, only a single surface of the articles need be formed of the brass or copper material in order to meet the functional or aesthetic requirements of the articles. On the other hand, where the articles are formed of brass-plated low carbon steel or the like, it is found that rapid corrosion of the steel material tends to occur resulting in rapid failure of the article either through structural weakening of the article or through the rust staining which occurs with the corrosion of the steel layer of the material.

It is an object of this invention to provide a novel and improved composite material; to provide such a material which incorporates a brass or copper surface therein, to provide such a material which is readily formed into articles of commerce such as lamp bulb bases, door knobs and the like with the brass or copper surface of the material facing exteriorly of the article; to provide such a material which incorporates a steel layer and which incorporates means for protecting the steel layer against corrosion; and to provide such a material which is of inexpensive manufacture.

Briefly described, the novel and improved composite metal laminate material of this invention comprises a layer of brass or copper material and a layer of aluminum material which are solid-phase, metallurgically bonded to respective opposite sides of a layer of low carbon steel. In this arrangement, the aluminum material embodied in the composite laminate is higher or more anodic in the galvanic series of metals and alloys than either the brass or copper or the steel layer of the laminate so that the aluminum layer of the laminate tends to corrode in preference to the brass or copper or steel layers of the laminate in the presence of moisture. This composite metal laminate material is readily formed into articles of commerce such as lamp bulb bases and door knobs and the like by conventional deep-drawing and other article-forming techniques to dispose the brass layer of the composite material facing exteriorly of the articles. These articles are then adapted for long service lives without rusting or corrosion of the steel layers of the composite laminate material, the aluminum layer of the composite material serving as a preferentially corrosive layer of the laminate and being corroded in use without causing significant structural weakening of the articles and without development of unsightly corrosion products.

Other objects, advantages and details of the composite materials and articles of this invention appear in the following, more detailed description of preferred embodiments of the invention, the more detailed description referring to the drawings in which:

FIG. 3 is an axial section view to enlarged scale through a door knob of this invention.

Figure 1:
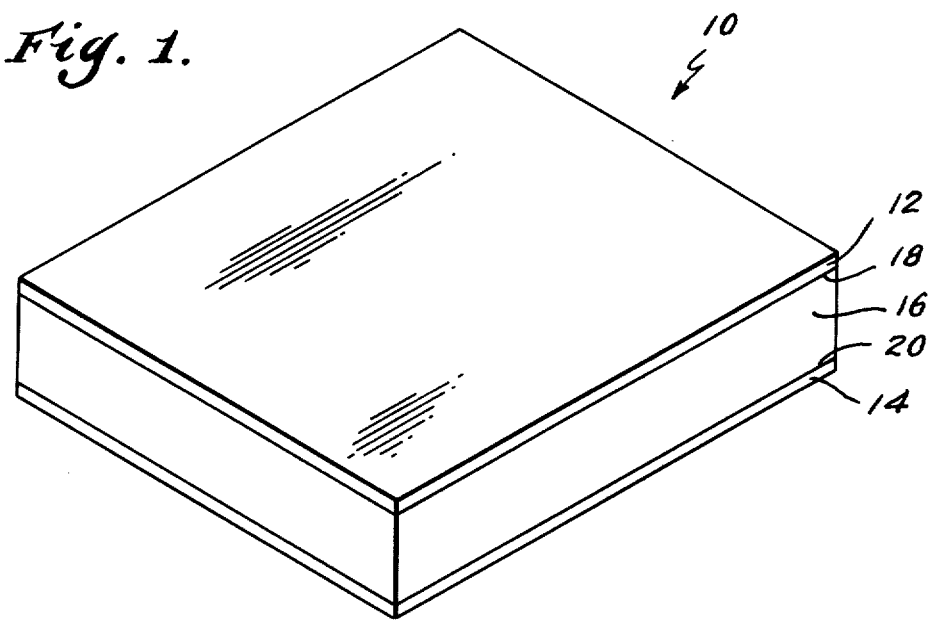
FIG. 1 is a prospective view of a composite metal laminate material of this invention.

Referring to the drawings, 10 in FIG. 1 illustrates the novel composite metal laminate material of this invention which is shown to include a layer 12 of brass or copper material, a layer 14 of aluminum material, and a layer 16 of steel material, the layers 12 and 14 of the laminate being solid-phase metallurgically bonded to the layer 16 of the laminate substantially throughout the interfaces 18 and 20 between the laminate layers.

In accordance with this invention, the materials of the composite laminate material 10 are selected so that the layer 12 is formed of brass or copper to provide the composite material with the color, electrical conductivity and surface contact characteristics of brass and copper, so that the layer 16 is formed of steel — preferably inexpensive low carbon steel — to provide the laminate material with strength and formability, and so that the layer 14 is formed of aluminum to be higher or more anodic in the galvanic series of metals and alloys than either the copper or brass material of layer 12 or the steel material of layer 16.

For example, in a preferred embodiment of the composite material of this invention, the layer 12 of the composite material 10 is preferably formed of deoxidized high phosphorus (DHP) copper which comprises, by weight, 99.90% (Min.) copper with from 0.015% to 0.040% phosphorus and the remainder impurities; the layer 16 of the composite material is preferably formed of 1006 low carbon steel which comprises, by weight, 0.08% (Max.) carbon, 0.25 to 0.40% manganese, 0.40% (Max.) phosphorus, 0.050% (Max.) silicon, and the balance iron; and the layer 14 of the composite material is preferably formed of 3003 Alloy aluminum which comprises, by weight, from 1.0 to 1.5% manganese, 0.6% (Max.) silicon, 0.7% (Max.) iron, 0.20% (Max.) copper 0.10% (Max.) zinc and the balance aluminum with not more than 0.05% (Max.) of any other element and not more than a total of 0.15% (Max.) of other elements present as impurities. In accordance with this invention, these layer materials are solid-phase metallurgically bonded together substantially throughout the interfaces 18 and 20 in any conventional manner so that the material layers are securely attached to each other and so that, preferably, the interfaces 18 and 20 of the composite material are substantially free of intermetallic compounds such as aluminum-iron intermetallic compounds. For example, the layer materials are bonded together in the manners shown in U.S. Pat. No. 3,481,023, in U.S. Pat. No. 2,753,623 or U.S. Pat. No. 2,691,815 or in other conventional manner within the scope of this invention. Preferably, metal layer thicknesses in the composite material are arranged so that the brass or copper layer 12 comprises about 10% of the total composite thickness, and so that the aluminum layer 14 of the composite comprises about 3% of the total composite thickness. Of course, other brass or copper, steel and aluminum alloys and materials other than those specifically described above can be embodied in the same sequence with similar or substantially different layer thicknesses within the scope of this invention, always providing that the aluminum material used is higher or more anodic than in the galvanic series of metals and alloys than the other materials of the composite. In this regard, the term aluminum alloys as used herein is intended to include all metal alloys in which a major constituent of the alloy is formed of aluminum; the term brass as used herein is considered to include all copper-zinc alloys and the like conventionally identified by the term brass; and the term copper alloys as used herein is considered to include all alloys, other than brass, in which copper comprises a major constituent of the alloy. The term steel as used herein includes low, medium and high carbon steels, alloy steels and stainless steels as will be understood. For example, in another preferred embodiment of the composite material of this invention, the layer 12 of the composite material is formed of cartridge brass having a nominal composition, by weight, of 70% copper and 30% zinc, this brass material having a specific composition, by weight of 68.5 to 71.5% copper, 0.07% (Max.) lead, 0.05% (Max.) iron, and the remainder zinc. The layers 14 and 16 of this alternate embodiment of this invention can be formed of the aluminum and steel materials specifically described above.

Figure 2:
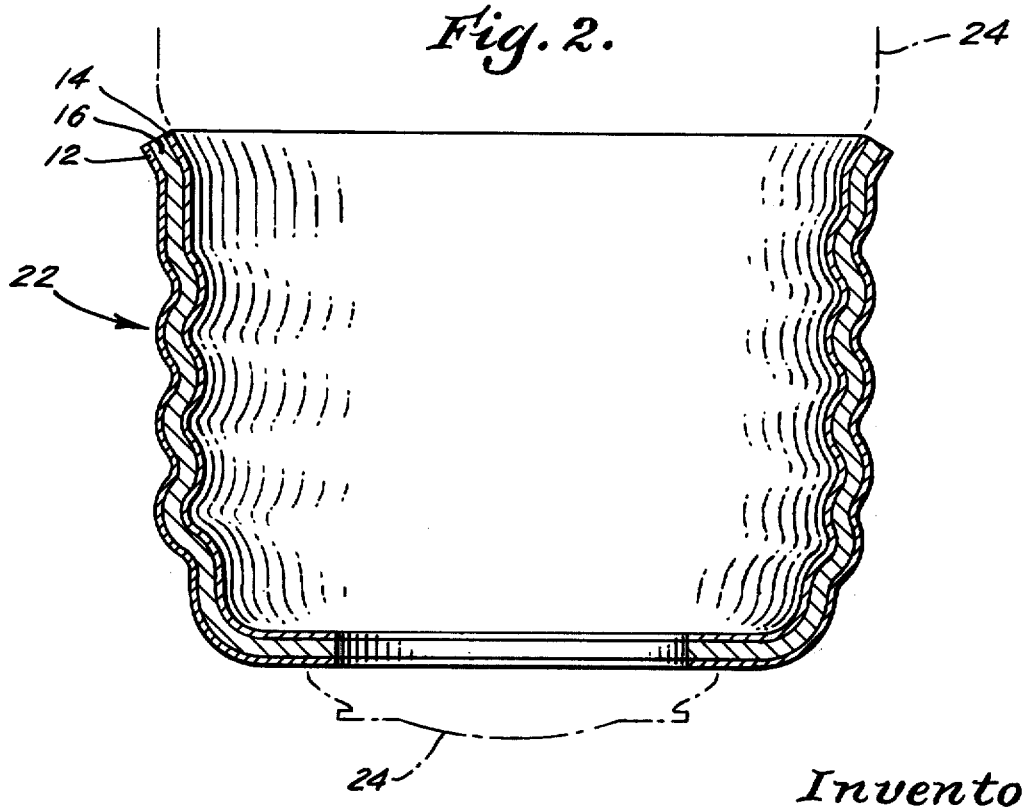
FIG. 2 is an axial section view to enlarged scale through a lamp bulb base of this invention.

As indicated in FIG. 2 of the drawings, this composite material 10 is readily formed into an article such as a generally cup-shaped lamp bulb base 22 by any conventional deep-drawing technique or other known article-forming method, the features of the lamp bulb other than the base being indicated in FIG. 2 by the broken lines 24. In the lamp bulb base 22, the composite layer 12, preferably formed of brass such as the cartridge brass identified above, is disposed on the exterior surface of the lamp bulb base to provide the base with the desired electrical contact surface. In this arrangement, substantially only the brass material of the composite is exposed to moisture outside the lamp bulb, the edges of the steel layer 16 and aluminum layer 14 also being exposed to some extent as indicated in FIG. 2. It is found in use that the presence of the aluminum layer 14 of the composite material 10 substantially completely protects the steel layer of the lamp bulb base including the edge of the steel layer from corrosion throughout a service life of the lamp bulb base exceeding the normal service life of the lamp bulb itself, even when the lamp bulb is exposed to relatively severe moisture conditions. In effect, the composite material embodied in the base is effectively comparable in corrosion resistance to a solid brass lamp bulb base. In addition, the composite material is readily formed into the lamp bulb base configuration and, during use, displays significantly greater strength and retention of configuration dimensions than a lamp bulb base made from solid brass. Further, because the main constituent of the lamp bulb base is steel, the cost of the base is lower than that of a solid brass base.

Similarly, as indicated in FIG. 3 of the drawings, the composite material 10 is readily formed into an article such as a generally ball-shaped door knob 26 with the composite material layer 12, preferably formed of cartridge brass or the like as above described, disposed on the exterior surface of the door knob as shown in FIG. 3. In this arrangement, the composite material 10 is readily formed into the desired door knob configuration by conventional hydraulic forming techniques or the like and displays the same aesthetically desirable brass color as a door knob made from solid brass. The door knob also displays substantially the same resistance to acid corrosion and the like resulting from contact with the hands as would a solid brass door knob. Further, because the principal constituent of the door knob is formed of steel, the knob displays substantially greater strength and resistance to denting than a solid brass door knob. Alternately, where this additional strength is not required, the door knob can be proportioned to display substantially the same strength as a conventional brass door knob, the door knob of this invention displaying this strength with a substantially thinner layer of the composite material. Finally, it is found that the presence of the aluminum layer 14 in the door knob substantially prevents corrosion or rest-staining of the steel layer of the door knob material in that the aluminum layer of the door knob material is corroded in preference to the steel layer in the presence of moisture. This protection against corrosion of the steel layer of the composite material embodied in the door knob can be expected to last as long as the useful service life of the conventional solid brass door knob even in exterior door knobs and even in areas such as the area of the door knob mounting aperture 28 where an edge of the steel layer of the material will be substantially exposed as indicated at 30 in FIG. 3. Of course, the composite material 10 of this invention will also be useful in forming door knob surrounds, door hinges and the like.

With regard to the resistance to corrosion displayed by the composite material of this invention, note that, when a composite material is formed of a layer of steel and a layer of brass or copper, a galvanic couple is established between the composite layers in the presence of moisture, this galvanic couple resulting in fairly rapid corrosion of the steel material. However, when the composite material 10 of this invention embodying copper or brass and steel layers in conjunction with an aluminum layer is subjected to the same moisture conditions, the corrosion rate of the steel material in the composite falls to a minimal value. As an illustration of this advantage of the composite material of this invention, note that when a strip of 1006 steel material as above described is disposed in a 5% (by weight) aqueous sodium chloride solution at a temperature of 30°C. along with a standard calomel electrode, the corrosion potential of the steel material (expressed in potential of the steel material versus the standard calomel electrode) is minus 0.65 volts and the steel corrodes at a rate (expressed in terms of milliamps of corrosion current per square centimeter) of 0.05 milliamps per square centimeter. When a layer of composite material having two outer layers of DHP copper as above described sandwiching a layer of 1006 steel is disposed in the same solution under the same conditions, the corrosion potential of this composite material is minus 0.45 volts. At this less negative potential versus the standard calomel electrode, the corrosion rate of the steel layer of the composite material is greatly increased to 10.0 milliamps per square centimeter, an increase in corrosion of about two orders of magnitude over the corrosion rate of the steel layer alone under the same conditions. On the other hand, when the composite material of this invention embodying DHP copper, 1006 steel and 3003 Alloy aluminum layers as above described is disposed in the same solution under the same conditions, the composite material of this invention displays the substantially more negative corrosion potential of minus 0.75 volts versus the standard calomel electrode. At this corrosion potential, the corrosion rate of the steel layer of the composite material 10 is decreased to 0.00001 milliamp per square centimeter, a decrease in corrosion rate of about six orders of magnitude as compared to steel material doubly clad with copper layers. Thus the steel layer of the composite material of this invention — even under the severe corrosion conditions as described — undergoes a minimal rate of corrosion. While the aluminum layer of the composite material 10 is corroded in preference to the corrosion of the steel layer, the corrosion of the aluminum layer does not tend to result in any significant structural weakening of the composite material and does not result in rust-staining and the like as occurs with steel corrosion.

It should be understood that although particular embodiments of the composite material and articles of this invention have been described by way of illustration, this invention includes all modifications and equivalents thereof falling within the scope of the appended claims.

We claim:

1. A lamp bulb base embodying a composite metal laminate material comprising a first layer of metal selected from the group consisting of copper, and copper alloys, a second layer of metal selected from the group consisting of aluminum and aluminum alloys, and an intermediate layer of steel sandwiched between and metallurgically bonded to said first and second metal layers, said layers of metal being coextensive in said composite material within said lamp bulb base, said second layer material being more anodic in the galvanic series of metals and alloys than the metals of said first and intermediate metal layers and being preferentially corrosive in said composite material, said composite material being formed in a generally cup-shaped configuration with said first layer of said composite material disposed in exteriorly facing relation in said lamp bulb base and with said second, preferentially corrosive, metal layer disposed in an interiorly facing relation in said lamp bulb base.

2. A lamp bulb base as set forth in claim 1 wherein said composite metal laminate material embodies selected materials, said first metal layer comprises a copper material comprising, by weight, 99.90% (Min.) copper with from 0.015% to 0.040% phosphorus and the remainder impurities, said second metal layer comprises an aluminum material comprising, by weight, from 1.0 to 1.5% manganese, 0.6% (Max.) silicon, 0.7% (Max.) iron, 0.20% (Max.) copper, 0.10% (Max.) zinc and the balance aluminum with not more than 0.05% (Max.) of any other element and not more than a total of 0.15% (Max.) of other elements present as impurities, and said intermediate metal layer comprises a steel material comprising, by weight, 0.08% (Max.) carbon, 0.25 to 0.40% manganese, 0.40% (Max.) phosphorus, 0.050% (Max.) silicon, and the balance iron.

3. A lamp bulb base as set forth in claim 1 wherein said composite metal laminate material embodies selected materials, said first metal layer comprises a brass material comprising, by weight, 68.5 to 71.5% copper, 0.07% (Max.) lead, 0.05% (Max.) iron, and the remainder zinc, said second metal layer comprises an aluminum material comprising, by weight, from 1.0 to 1.5% manganese, 0.6% (Max.) silicon, 0.7% (Max.) iron, 0.20% (Max.) copper, 0.10% (Max.) zinc and the balance aluminum with not more than 0.05% (Max.) of any other element and not more than a total of 0.15% (Max.) of other elements present as impurities, and said intermediate metal layer comprises a steel material comprising, by weight, 0.08% (Max.) carbon, 0.25 to 0.40% manganese, 0.40% (Max.) phosphorus, 0.050% (Max.) silicon, and the balance iron.

4. A lamp bulb base as set forth in claim 1 wherein said composite metal laminate material has metal layers of selected proportions therein, said first metal layer has a thickness comprising approximately 10% of the total thickness of the composite metal laminate material and wherein said second metal layer has a thickness comprising approximately 3% of the total thickness of the composite metal laminate material.

5. A door knob embodying a composite metal laminate material, said composite material comprising a first layer of metal selected from the group consisting of copper, and copper alloys, a second layer of metal selected from the group consisting of aluminum and aluminum alloys, and an intermediate layer of steel sandwiched between and metallurgically bonded to said first and second metal layers, said layers of metal being coextensive in said composite material within said door knob, said second layer material being more anodic in a galvanic series of metals and alloys than the metals of said first and intermediate metal layers and being preferentially corrosive in said composite material, said composite material being formed into a generally ball-shaped configuration with said first layer of said composite metal material disposed in exteriorly facing relation in said door knob and with said second, preferentially corrosive, metal layer disposed in interiorly facing relation in said door knob.

6. A door knob as set forth in claim 5 wherein said composite metal material embodies selected layer materials, said first metal layer comprises a copper material comprising, by weight, 99.90% (Min.) copper with from 0.015% to 0.040% phosphorus and the remainder impurities, said second metal layer comprises an aluminum material comprising, by weight, from 1.0 to 1.5% manganese, 0.6% (Max.) silicon, 0.7% (Max.) iron, 0.20% (Max.) copper, 0.10% (Max.) zinc and the balance aluminum with not more than 0.05% (Max.) of any other element and not more than a total of 0.15% (Max.) of other elements present as impurities, and said intermediate metal layer comprises a steel material comprising, by weight, 0.08% (Max.) carbon, 0.25 to 0.40% manganese, 0.40% (Max.) phosphorus, 0.050% (Max.) silicon, and the balance iron.

7. A door knob as set forth in claim 5 wherein said composite metal laminate material embodies selected layer materials, said first metal layer comprises a brass material comprising, by weight, 68.5 to 71.5% copper, 0.07% (Max.) lead, 0.05% (Max.) iron, and the remainder zinc, said second metal layer comprises an aluminum material comprising, by weight, from 1.0 to 1.5% manganese, 0.6% (Max.) silicon, 0.7% (Max.) iron, 0.20% (Max.) copper, 0.10% (Max.) zinc and the balance aluminum with not more than 0.05% (Max.) of any other element and not more than a total of 0.15% (Max.) of other elements present as impurities, and said intermediate metal layer comprises a steel material comprising, by weight, 0.08% (Max.) carbon, 0.25 to 0.40% manganese, 0.40% (Max.) phosphorus, 0.050% (Max.) silicon, and the balance iron.

8. A door knob as set forth in claim 5 wherein said composite metal laminate material embodies layers of selected proportions, said first metal layer has a thickness comprising approximately 10% of the total thickness of the composite metal laminate material and wherein said second metal layer has a thickness comprising approximately 3% of the total thickness of the composite metal laminate material.

\* \* \* \* \*